(12) United States Patent
Yamada et al.

(10) Patent No.: US 9,071,166 B2
(45) Date of Patent: Jun. 30, 2015

(54) POWER CONVERTER WITH SURGE VOLTAGE SUPPRESSION

(75) Inventors: Ryuji Yamada, Hachioji (JP); Kazuaki Mino, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 259 days.

(21) Appl. No.: 13/809,589

(22) PCT Filed: Aug. 25, 2011

(86) PCT No.: PCT/JP2011/069203
§ 371 (c)(1),
(2), (4) Date: Mar. 14, 2013

(87) PCT Pub. No.: WO2012/026535
PCT Pub. Date: Mar. 1, 2012

(65) Prior Publication Data
US 2013/0170268 A1    Jul. 4, 2013

(30) Foreign Application Priority Data

Aug. 25, 2010    (JP) ................. 2010-187733

(51) Int. Cl.
*H02M 7/5387*    (2007.01)
*H02M 7/537*    (2006.01)
*H02M 7/538*    (2007.01)
*H02P 27/08*    (2006.01)
(Continued)

(52) U.S. Cl.
CPC ............ *H02M 7/537* (2013.01); *H02M 7/5387* (2013.01); *H02M 7/538* (2013.01); *H02P 27/08* (2013.01); *H02M 1/126* (2013.01); *H02M 7/48* (2013.01)

(58) Field of Classification Search
USPC ............ 323/271, 272; 363/34, 35, 39, 40, 97, 363/98, 132, 131, 127
See application file for complete search history.

(56) References Cited

U.S. PATENT DOCUMENTS 5,633,793 A * 5/1997 Lee et al. ...................... 363/127
6,181,539 B1   1/2001 Maejima et al.
(Continued)

FOREIGN PATENT DOCUMENTS

CN    1905339 A    1/2007
CN    101689811 A    3/2010
(Continued)

OTHER PUBLICATIONS

Chinese Office Action dated on Sep. 16, 2014.

*Primary Examiner* — Matthew Nguyen
*Assistant Examiner* — Trinh Dang
(74) *Attorney, Agent, or Firm* — Rabin & Berdo, P.C.

(57) ABSTRACT

A motor drive system wherein an LC circuit exists between an inverter and a motor is such that switching of semiconductor switching elements Su to Sw and Sx to Sz configuring the inverter is controlled by an on-signal formed of a first on-signal, a second on-signal, and an off-state period of a time the same as the first on-signal provided between the first on-signal and second on-signal, and by an off-signal formed of a first off-signal, a second off-signal, and an on-state period of a time the same as the first off-signal provided between the first off-signal and second off-signal, and surge voltage applied to an input terminal of the motor is suppressed by the time of the first on-signal and the time of the second off-signal being set to one-sixth of a resonance cycle specific to the LC circuit.

9 Claims, 9 Drawing Sheets

(51) Int. Cl.
*H02M 1/12* (2006.01)
*H02M 7/48* (2007.01)

(56) References Cited

U.S. PATENT DOCUMENTS

| | | | |
|---|---|---|---|
| 2003/0117815 A1 | 6/2003 | Saada | |
| 2010/0208499 A1 | 8/2010 | Halberstadt | |
| 2011/0115417 A1* | 5/2011 | Shimada | 318/139 |
| 2012/0187894 A1* | 7/2012 | Higuchi et al. | 318/811 |

FOREIGN PATENT DOCUMENTS

| | | |
|---|---|---|
| JP | 08-023682 A | 1/1996 |
| JP | 11-164562 A | 6/1999 |
| JP | 2003-020997 A | 1/2003 |
| JP | 2006-115667 A | 4/2006 |
| JP | 2007-166708 A | 6/2007 |
| JP | 2010-119184 A | 5/2010 |
| JP | 2010-136564 A | 6/2010 |
| WO | WO-2010-067679 A1 | 6/2010 |

* cited by examiner

POWER CONVERTER WITH SURGE VOLTAGE SUPPRESSION

BACKGROUND

1. Technical Field

The present invention relates to a power converter that enables suppression of surge voltage generated due to a switching action of a semiconductor switching element.

2. Background Art

In general, when driving an alternating current motor, the voltage of a direct current power source is converted in a voltage type PWM inverter into a pulse voltage sequence equivalent to a sine wave (a waveform that becomes a sine wave when components equal to or greater than the switching frequency are removed), and the pulse width modulated sinusoidal voltage is applied to the motor.

FIG. 8 is a schematic configuration diagram of a system that drives a motor using this kind of method. In FIG. 8, 1 is a direct current power source, 2 is a three-phase voltage type PWM inverter (hereafter referred to as an inverter) connected to the direct current power source 1, 3 is a control circuit for controlling the inverter 2, 3a is a pulse width modulation unit included in the control circuit 3, and 4 is a motor driven by the inverter 2.

The inverter 2 is configured of a three-phase bridge formed of a U-phase wherein semiconductor switching elements Su and Sx are connected in series, a V-phase wherein Sv and Sy are connected in series, and a W-phase wherein Sw and Sz are connected in series.

The inverter 2 and motor 4 are connected by wiring, and a resistance component and inductance component exist in the wiring. Furthermore, floating capacitance exists between each phase of the wiring between the inverter 2 and motor 4 and between each phase of the wiring and the ground. In FIG. 8, Ls indicates the inductance of the wiring between the inverter 2 and motor 4, while Cs indicates the floating capacitance between each phase of wiring and the ground or a reference potential. A depiction of the resistance component of each phase of wiring or the like is omitted.

Herein, a positive side terminal of the direct current power source 1 is P, while a negative side terminal is N. Also, a connection midpoint of the semiconductor switching elements Su and Sx of the inverter 2 is U, a connection midpoint of Sv and Sy is V, and a connection midpoint of Sw and Sz is W. Also, three-phase input terminals of the motor 4 are U1, V1, and W1.

This kind of motor drive system is such that the control circuit 3 generates a signal in the pulse width modulation unit 3a for controlling the turning on and off of the semiconductor switching elements Su to Sw and Sx to Sz in the inverter 2 using a PWM (pulse width modulation) operation that compares the magnitude of the values of a sine wave (modulation signal) and a triangular wave (carrier signal). The inverter 2 switches the on or off status of the semiconductor switching elements Su to Sw and Sx to Sz in accordance with the control signal generated by the control circuit 3, thereby converting the voltage of the direct current power source 1 into a square wave voltage with a pulse width modulated pulse form. The square wave voltage with the pulse width modulated pulse form is output by the output terminals U, V, and W of the inverter 2, and is applied to the input terminals U1, V1, and W1 of the motor 4 via the wiring.

Meanwhile, the inductor Ls and floating capacitor Cs exist in the wiring between the inverter 2 and motor 4, as shown in FIG. 8. When the square wave voltage with the pulse width modulated pulse form is applied to an LC circuit configured of the inductor Ls and floating capacitor Cs, a resonance phenomenon occurs between the inverter 2 and LC circuit.

FIG. 9 is a diagram showing resonance voltage generated between the input terminals U1 and V1 of the motor 4 when the semiconductor switching element Su of the inverter 2 performs an on-off action. Hereafter, the potential reference point of each terminal is taken to be the N point of FIG. 8.

When the control signal for the semiconductor switching element Su changes from Low to High, the semiconductor switching element Su changes from an off-state to an on-state. When the semiconductor switching element Su changes from an off-state to an on-state, the U terminal voltage of the inverter 2 changes from 0(V) to a voltage Ed(V) of the direct current power source. The U terminal voltage of the inverter 2 is applied to the input terminal U1 of the motor 4. At this time, LC resonance is generated among the inverter 2, the inductor Ls and the floating capacitor Cs, and resonance voltage is applied between the U1 and V1 terminals of the motor 4.

This resonance voltage forms surge voltage whose oscillation diminishes with time owing to the resistance component (not shown) of the wiring, or the like, between the inverter 2 and motor 4, but the maximum value of the surge voltage reaches approximately twice that of the voltage Ed(V) of the direct current power source 1. Further, it is known that this excessive surge voltage and a temporal rate of change dv/dt thereof cause dielectric breakdown of the motor 4.

A surge voltage suppression device formed of a rectifier configured of a diode bridge in a motor input terminal portion and a capacitor and resistor connected in parallel to either end of a direct current terminal of the rectifier has been proposed as a method of preventing this kind of motor dielectric breakdown caused by excessive surge voltage (for example, refer to PTL 1, identified below). Also, as an improvement on this, a surge voltage suppression device wherein current flowing through the resistor connected to the direct current terminal of the rectifier is controlled by a semiconductor switching element has been proposed (for example, refer to PTL 2, identified below). Also, a surge voltage suppression method whereby surge voltage energy is returned to the power source by a direct current terminal of a rectifier being connected to an input terminal of an inverter, and the like, has been proposed (for example, refer to PTL 3, identified below). Also, a surge voltage suppression method whereby a reactor is connected between an inverter and a motor, and a serial body of a resistor and a capacitor is connected in parallel to the reactor, has been proposed (for example, refer to PTL 4, identified below).

PTL 1: JP-A-8-23682
PTL 2: JP-A-2006-115667
PTL 3: JP-A-2010-136564
PTL 4: JP-A-2007-166708

However, with the previously described methods, it is necessary to add a surge voltage suppression device formed of a rectifier, resistor, capacitor, and the like, or a surge voltage suppression circuit formed of a reactor, resistor, and capacitor, in order to suppress surge voltage, which leads to an increase in size and increase in cost of the power converter.

SUMMARY

The invention, in an attempt to solve this kind of problem with the heretofore known surge voltage suppression devices, has an object of providing a power converter such that it is possible to suppress surge voltage applied to a motor without adding special parts, or by adding a minimal number of parts.

In order to achieve the heretofore described object, first problem solving means is a power converter that includes a semiconductor switching element and a control circuit that controls the turning on and off of the semiconductor switching element, converts power received from a power source and supplies the power to a load, and has the following configuration.

That is, the control circuit is such that a control signal for turning the semiconductor switching element into an on-state is configured of a first on-signal and a second on-signal. Furthermore, an off-state period of a time practically the same as a period of the first on-signal is provided between the first on-signal and second on-signal. Further, the period for which the first on-signal of the control signal is output and the off-state period provided between the first on-signal and second on-signal are set to a time practically one-sixth of a resonance cycle of impedance existing between the semiconductor switching element and the load.

Also, second problem solving means is a power converter that includes a semiconductor switching element and a control circuit that controls the turning on and off of the semiconductor switching element, converts power received from a power source and supplies the power to a load, and has the following configuration.

That is, the power converter includes an LC circuit formed of an inductor connected between the semiconductor switching element and the load, and a capacitor connected between a terminal, of terminals of the inductor, connected to the load side and one end of the power source.

Also, the control circuit is such that a control signal for turning the semiconductor switching element into an on-state is configured of a first on-signal and a second on-signal. Furthermore, an off-state period of a time practically the same as a period of the first on-signal is provided between the first on-signal and second on-signal. Further, the period for which the first on-signal of the control signal is output and the off-state period provided between the first on-signal and second on-signal are set to a time practically one-sixth of a resonance cycle of the LC circuit provided between the semiconductor switching element and the load.

According to the first or second problem solving means, it is possible to generate LC resonance at each step of a rise of the first on-signal (a first step), a fall of the first on-signal (a second step), and a rise of the second on-signal (a third step) when the semiconductor switching element is turned on, meaning that the LC resonance voltage generated from the first step to the third step is superimposed in an input terminal portion of the motor, and it is thus possible to counteract the surge voltage.

Also, third problem solving means is a power converter that includes a semiconductor switching element and a control circuit that controls the turning on and off of the semiconductor switching element, converts power received from a power source and supplies the power to a load, and has the following configuration.

That is, the control circuit is such that a control signal for turning the semiconductor switching element into an off-state is configured of a first off-signal and a second off-signal. Furthermore, an on-state period of a time practically the same as a period of the first off-signal is provided between the first off-signal and second off-signal. Further, the period for which the first off-signal of the control signal is output and the on-state period provided between the first off-signal and second off-signal are set to a time practically one-sixth of a resonance cycle of impedance existing between the semiconductor switching element and the load.

Also, fourth problem solving means is a power converter that includes a semiconductor switching element and a control circuit that controls the turning on and off of the semiconductor switching element, converts power received from a power source and supplies the power to a load, and has the following configuration.

That is, the power converter includes an LC circuit formed of an inductor connected between the semiconductor switching element and the load, and a capacitor connected between a terminal, of terminals of the inductor, connected to the load side and one end of the power source.

Also, the control circuit is such that a control signal for turning the semiconductor switching element into an off-state is configured of a first off-signal and a second off-signal. Furthermore, an on-state period of a time practically the same as a period of the first off-signal is provided between the first off-signal and second off-signal. Further, the period for which the first off-signal of the control signal is output and the on-state period provided between the first off-signal and second off-signal are set to a time practically one-sixth of a resonance cycle of the LC circuit provided between the semiconductor switching element and the load.

According to the third or fourth problem solving means, it is possible to generate LC resonance at each step of a fall of the first off-signal (a first step), a rise of the first off-signal (a second step), and a fall of the second off-signal (a third step) when the semiconductor switching element is turned off, meaning that the LC resonance voltage generated from the first step to the third step is superimposed in an input terminal portion of the motor, and it is thus possible to counteract the surge voltage.

BRIEF DESCRIPTION OF THE DRAWINGS

FIG. 2 is a diagram illustrating a principle of suppressing motor terminal portion surge voltage generated when a semiconductor switching element is turned on.

FIG. 4A is a diagram showing one example of a surge voltage suppression processing unit that generates a control signal for a semiconductor switching element in the power converter according to the invention, while

DETAILED DESCRIPTION

Hereafter, a detailed description will be given of an embodiment of the invention, based on FIG. 1 to FIG. 7. In FIG. 1 to FIG. 7, the same reference signs will be given to components the same as those in a heretofore known motor drive system shown in FIG. 8, and a description thereof will be omitted.

Figure 1:
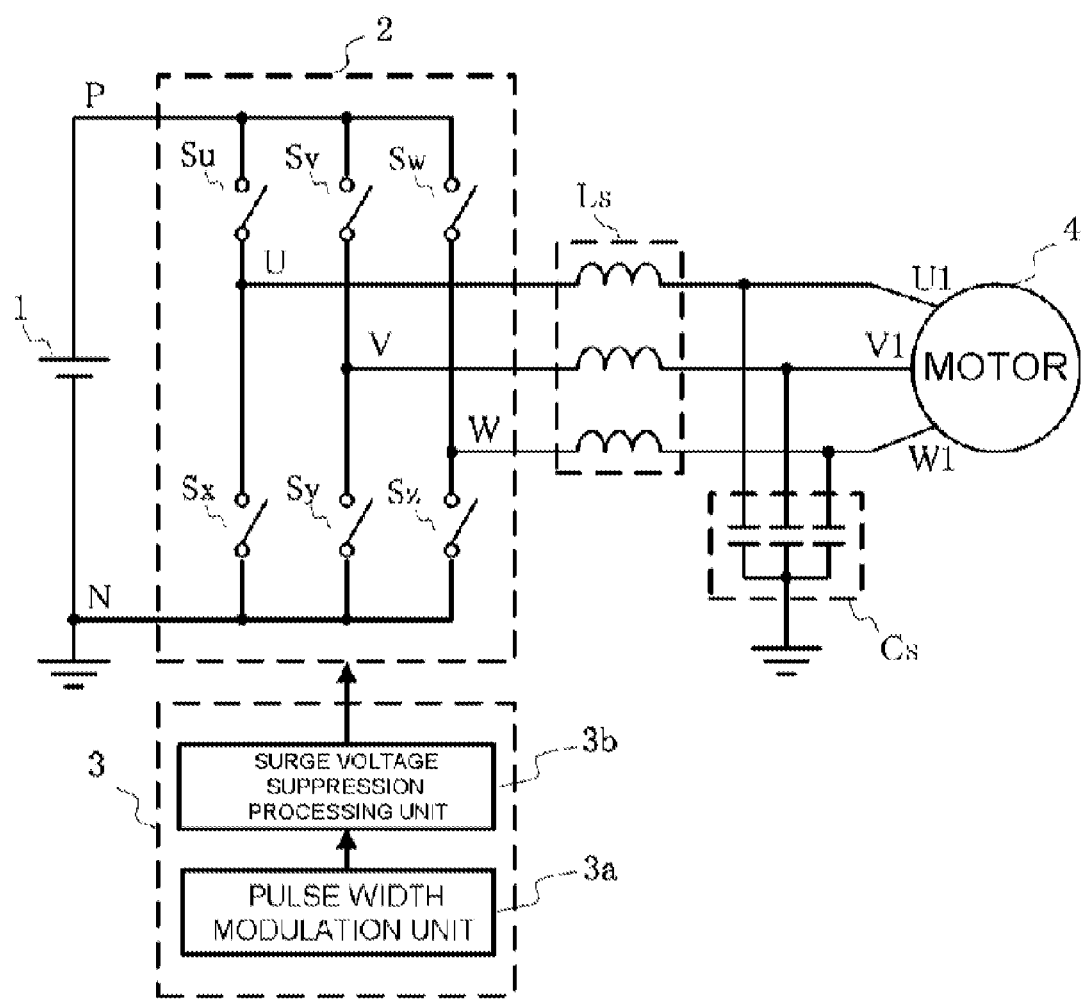
FIG. 1 is a diagram showing one working example of a power converter according to the invention.

FIG. 1 is a circuit configuration diagram showing a motor drive system using a power converter according to the invention. In FIG. 1, a direct current power source 1, an inverter 2, a motor 4, a wire inductor Ls, and a floating capacitor Cs are the same as in a circuit configuration diagram showing the motor drive system according to the heretofore known technology shown in FIG. 8. Also, apart from an induction motor or synchronous motor, an induction generator, synchronous generator, and the like, are included as the motor 4 driven by the inverter 2.

Figure 8:
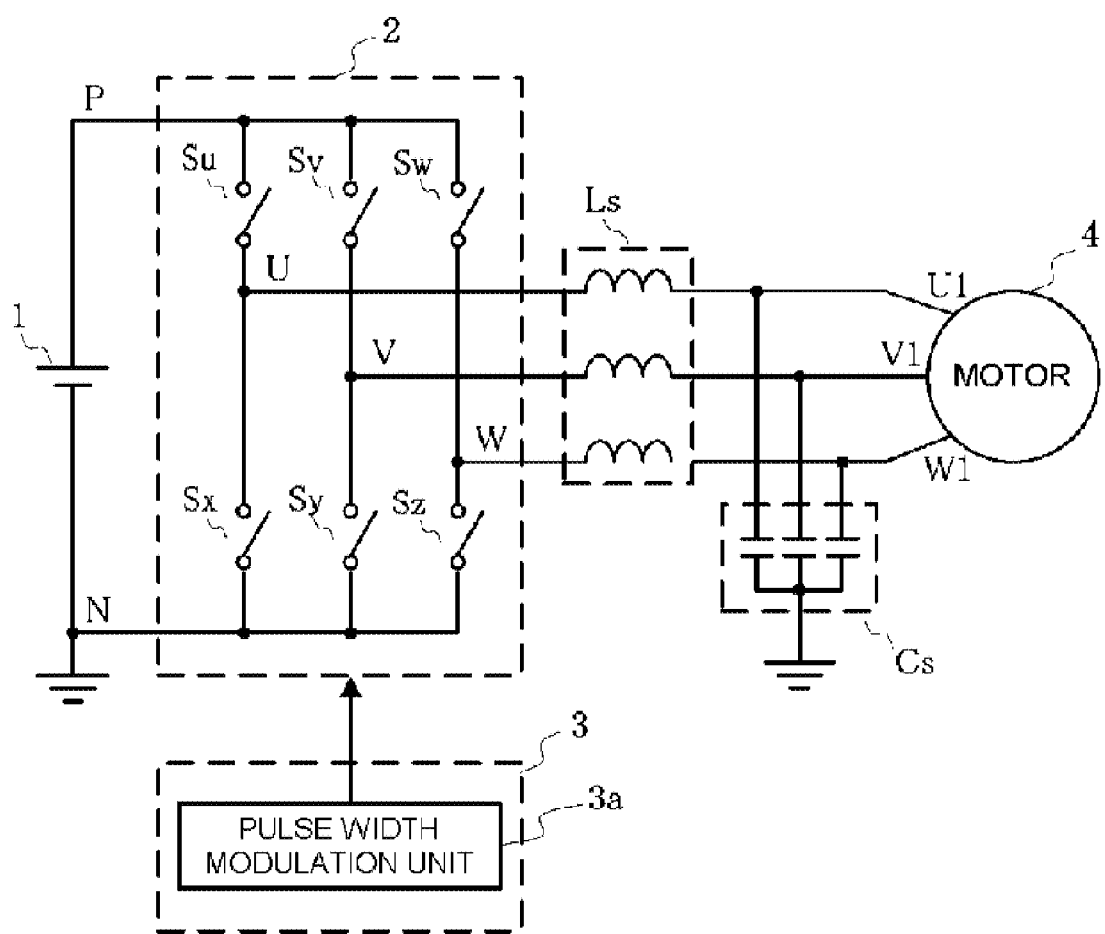
FIG. 8 is a diagram showing a motor drive system using a power converter according to heretofore known technology.

A control circuit 3 of FIG. 1 includes a pulse width modulation unit 3a the same as in the circuit configuration diagram showing the motor drive system according to the heretofore known technology shown in FIG. 8, and further includes a surge voltage suppression processing unit 3b. The surge voltage suppression processing unit 3b generates a control signal for controlling the turning on and off of semiconductor switching elements Su to Sw and Sx to Sz of the inverter 2 from a signal generated by the pulse width modulation unit 3a.

Although the following description is given with the semiconductor switching element Su, of the plurality of semiconductor switching elements configuring the inverter 2, as an example, practically the same control as for the Su is carried out for the other semiconductor switching elements Sv, Sw, Sx, Sy, and Sz too, although a description is omitted.

Figure 2:
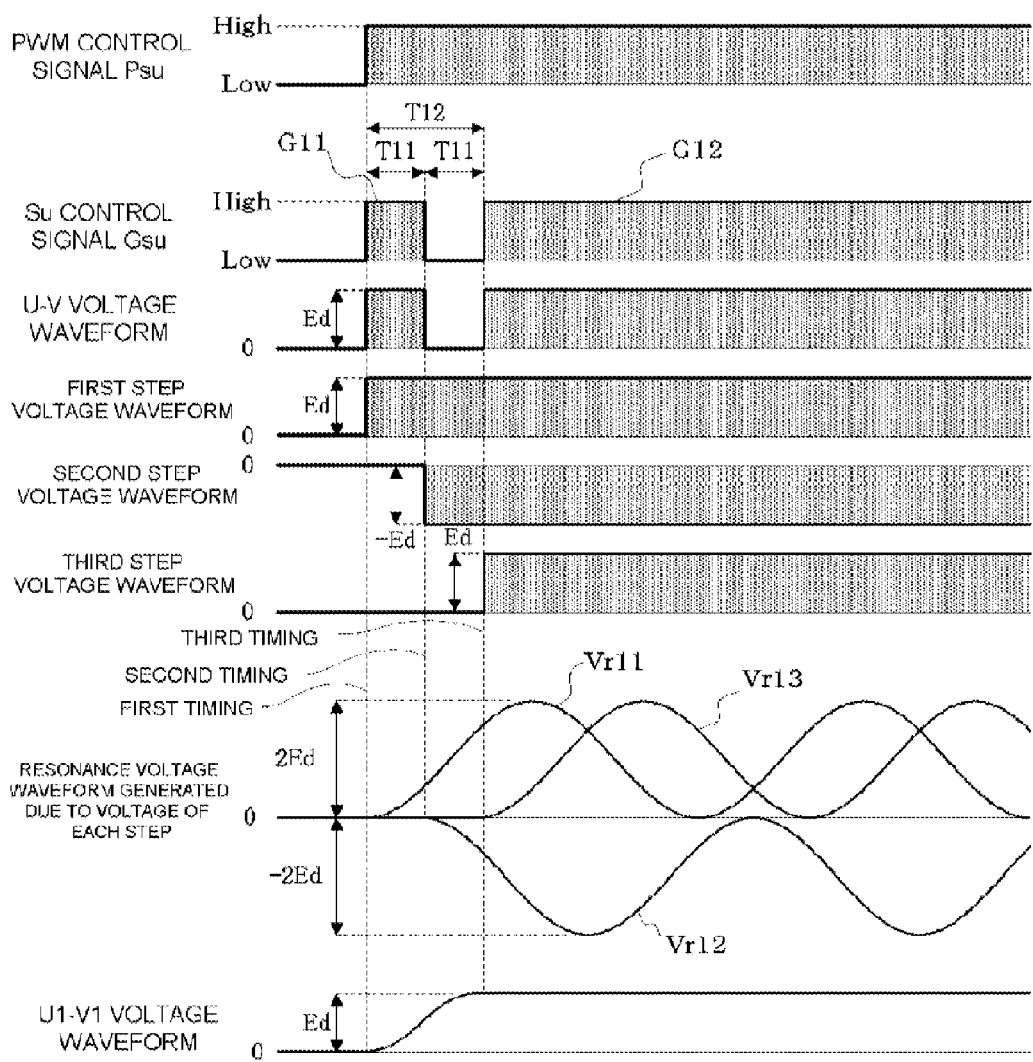

FIG. 2 is a diagram showing a principle of suppressing surge voltage in the motor drive system shown in FIG. 1 when the semiconductor switching element Su of the inverter 2 shifts to an on-state. The potential reference point of each terminal is a point N of FIG. 1.

Firstly, a pulse width modulation signal Psu for the semiconductor switching element Su is generated in the pulse width modulation unit 3a of the control circuit 3. The pulse width modulation signal Psu is obtained by comparing the magnitude of the values of a sine wave (modulation signal) and a triangular wave (carrier signal), in the same way as with the heretofore known technology shown in FIG. 8.

The surge voltage suppression processing unit 3b outputs a first on-signal G11 for a period T11, with a timing at which the pulse width modulation signal Psu rises from Low (the semiconductor switching element is off) to High (the semiconductor switching element is on) as an origin. Subsequently, after outputting an off-signal for the same period T11, the surge voltage suppression processing unit 3b outputs a second on-signal G12 until the pulse width modulation signal Psu becomes Low. A signal formed of the first on-signal G11, second on-signal G12, and the off-signal of the off-state period T11 provided between the first on-signal G11 and second on-signal G12 configures a control signal Gsu for turning the semiconductor switching element Su into an on-state.

Herein, a timing at which the first on-signal G11 rises is a first timing, a timing at which the first on-signal G11 falls is a second timing, and a timing at which the second on-signal G12 rises is a third timing.

The semiconductor switching element Su shifts sequentially from an off-state to an on-state at the first timing, an off-state at the second timing, and an on-state at the third timing, in accordance with the control signal Gsu. As a result of this, voltage between U and V terminals of the inverter 2 changes from 0(V) through Ed(V) and 0(V) to Ed(V) in response to the control signal Gsu (refer to FIG. 2). Herein, the changes in voltage at the first, second, and third timings are referred to as a first step, second step, and third step respectively.

The voltage output between the terminals U and V of the inverter 2 can be taken to be a combined voltage of three step voltages, those being a first step voltage and third step voltage that change to an amplitude Ed (V) at the first and third timings respectively, and a second step voltage that changes to an amplitude −Ed(V) at the second timing (all changing from 0(V)), as shown in the drawing. The first step voltage is a square wave voltage that changes to the positive side amplitude Ed(V) from the initial voltage 0(V) at the first timing. The second step voltage is a square wave voltage that reaches the negative side amplitude −Ed(V) from the initial voltage 0(V) at the second timing. The third step voltage is a square wave voltage that reaches the positive side amplitude Ed(V) from the initial voltage 0(V) at the third timing.

Meanwhile, the voltage step changes at the first to third timings cause resonance in an LC circuit formed of the wire inductor Ls and floating capacitor Cs shown in FIG. 1. That is, as shown in FIG. 2, a resonance voltage Vr11 generated due to the first step voltage is a sine wave voltage generated at the first timing, with an initial voltage of 0(V), that has a central voltage Ed(V) and an amplitude Ed(V). A resonance voltage Vr12 generated due to the second step voltage is a sine wave voltage generated at the second timing, with an initial voltage of 0(V), that has a central voltage −Ed(V) and an amplitude Ed(V). A resonance voltage Vr13 generated due to the third step voltage is a sine wave voltage generated at the third timing, with an initial voltage of 0(V), that has a central voltage Ed(V) and an amplitude Ed(V).

Also, taking the inductance value of the wire inductor Ls to be Lsx(H) and the capacitance value of the floating capacitor Cs to be Csx(F), cycles T of the resonance voltages Vr11 to Vr13 generated due to the first to third step voltages are all $1/[2\pi\sqrt{(Lsx \times Csx)}]$ (s). Consequently, a resonance frequency f is $1/T(Hz)$, while an angular frequency $\omega$ is $2\pi f(rad/s)$.

Herein, by setting the time of the period T11 to one-sixth of the cycles T of Vr11 to Vr13, the resonance voltages Vr12 and Vr13 generated due to the second step voltage and third step voltage have a relationship with respect to the resonance voltage Vr11 generated due to the first step voltage such that the phases thereof are "$(4/3)\pi(rad)$ delayed" and "$(2/3)\pi(rad)$ delayed" respectively.

Consequently, the resonance voltages Vr11 to Vr13 generated due to the first to third step voltages are expressed by $$Vr11 = Ed + Ed \cdot \sin[\omega t], Vr12 = -Ed + Ed \cdot \sin[\omega t - (4\pi/3)],$$
$$\text{and } Vr13 = Ed + Ed \cdot \sin[\omega t - (2\pi/3)].$$

Figure 9:
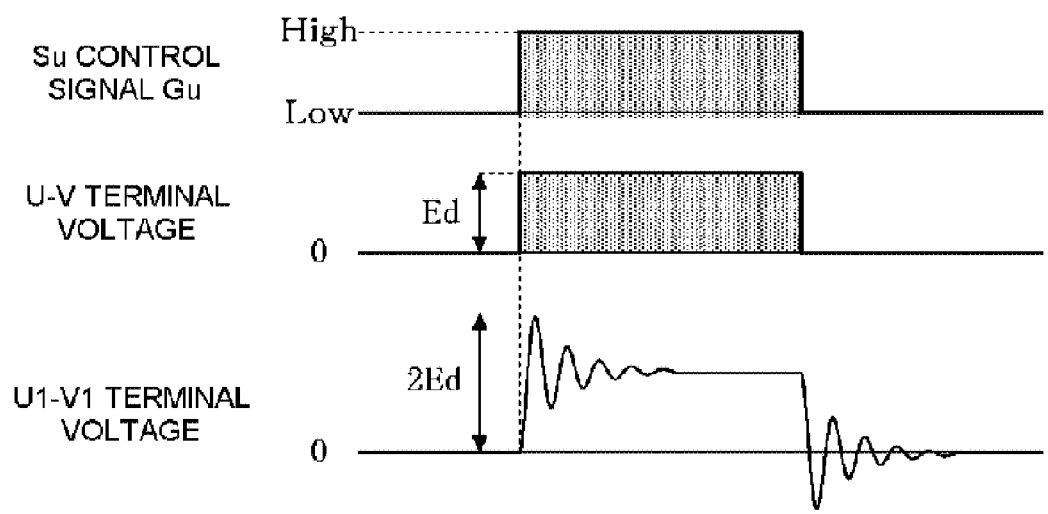
FIG. 9 is a diagram illustrating surge voltage generated in motor input terminals when driving the motor in the power converter shown in FIG. 8.

From the above description, it is seen that voltage generated between U1 and V1 terminals of the motor 4 in the period from the first timing to the third timing is a voltage wherein the resonance voltage Vr11 generated due to the first step voltage and the resonance voltage Vr12 generated due to the second step voltage are combined. Consequently, the voltage generated between the U1 and V1 terminals of the motor 4 in this period is a voltage having a rise gentler than that of a resonance voltage shown in FIG. 9. Also, from the third timing onward, the voltage is a voltage wherein the resonance voltages Vr11, Vr12, and Vr13 are combined. Consequently, the voltage generated between the U1 and V1 terminals of the motor 4 from the third timing onward is a direct current with a size of Ed(V).

From the above description, it is seen that, owing to the function of the surge voltage suppression processing unit according to the invention, the voltage between the U1 and V1 terminals of the motor 4 is a voltage that rises gently from 0(V) to the direct current voltage Ed(V), and not a surge voltage that rises abruptly. As a result of this, it is possible to prevent motor coil isolation.

Next, using FIG. 3, a description will be given of a principle of suppressing surge voltage in the motor drive system shown in FIG. 1 when the semiconductor switching element Su of the inverter 2 shifts to an off-state. The potential reference point of each terminal is the point N of FIG. 1, in the same way as in FIG. 2.

Firstly, a pulse width modulation signal Psu for the semiconductor switching element Su is generated in the pulse width modulation unit 3a of the control circuit 3. The pulse width modulation signal Psu is obtained by comparing the magnitude of the values of a sine wave (modulation signal) and a triangular wave (carrier signal), in the same way as with the heretofore known technology shown in FIG. 8.

The surge voltage suppression processing unit 3b outputs a first off-signal G21 for a period T21, with a timing at which the pulse width modulation signal Psu falls from High (the semiconductor switching element is on) to Low (the semiconductor switching element is off) as an origin. Subsequently, after outputting an on-signal for the same period T21, the surge voltage suppression processing unit 3b outputs a second off-signal G22 until the pulse width modulation signal Psu becomes High. A signal formed of the first off-signal G21, second off-signal G22, and the on-signal of the on-state period T21 provided between the first off-signal G21 and second off-signal G22 configures a control signal Gsu for turning the semiconductor switching element Su into an off-state.

Herein, a timing at which the first off-signal G21 falls is a first timing, a timing at which the first off-signal G21 rises is a second timing, and a timing at which the second off-signal G22 falls is a third timing.

The semiconductor switching element Su shifts sequentially from an on-state to an off-state at the first timing, an on-state at the second timing, and an off-state at the third timing, in accordance with the control signal Gsu. As a result of this, the voltage between the U and V terminals of the inverter 2 changes from Ed(V) through 0(V) and Ed(V) to 0(V) in response to the control signal Gsu (refer to FIG. 3). Herein, the changes in voltage at the first, second, and third timings are referred to as a first step, second step, and third step respectively.

The voltage output between the terminals U and V of the inverter 2 can be taken to be a combined voltage of three step voltages, those being a first step voltage and third step voltage that change from Ed(V) to 0(V) at the first and third timings respectively, and a second step voltage that changes from −Ed(V) to 0(V) at the second timing.

The first step voltage is a square wave voltage that changes to 0(V) from the initial voltage Ed(V) at the first timing. The second step voltage is a square wave voltage that changes to 0(V) from the initial voltage −Ed(V) at the second timing. The third step voltage is a square wave voltage that changes to 0(V) from the initial voltage Ed(V) at the third timing.

Further, the voltage step changes at the first to third timings cause resonance in the LC circuit formed of the wire inductor Ls and floating capacitor Cs shown in FIG. 1. A resonance voltage Vr21 generated due to the first step voltage is a sine wave voltage generated at the first timing, with an initial voltage of Ed(V), that has a central voltage 0(V) and an amplitude Ed(V). A resonance voltage Vr22 generated due to the second step voltage is a sine wave voltage generated at the second timing, with an initial voltage of −Ed(V), that has a central voltage 0(V) and an amplitude Ed(V). A resonance voltage Vr23 generated due to the third step voltage is a sine wave voltage generated at the third timing, with an initial voltage of Ed(V), that has a central voltage 0(V) and an amplitude Ed(V).

Also, the cycles T of the resonance voltages Vr21 to Vr23 generated due to the first to third step voltages are all $1/[2\pi\sqrt{(Ls \times Cs)}]$ (s). Consequently, the resonance frequency f is $1/T$(Hz), while the angular frequency ω is $2\pi f$(rad/s).

Herein, by setting the time of the period T21 to one-sixth of the cycles T of Vr21 to Vr23, the resonance voltages Vr22 and Vr23 generated due to the second step voltage and third step voltage have a relationship with respect to the resonance voltage Vr21 generated due to the first step voltage such that the phases thereof are $(4/3)\pi$(rad) delayed and $(2/3)\pi$(rad) delayed respectively.

Consequently, the resonance voltages Vr21 to Vr23 generated due to the first to third step voltages are expressed by $$Vr21 = Ed \cdot \sin[\omega t], Vr22 = Ed \cdot \sin[\omega t - (4\pi/3)], \text{ and}$$
$$Vr23 = Ed \cdot \sin[\omega t - (2\pi/3)].$$

From the above description, it is seen that voltage generated between the U1 and V1 terminals of the motor 4 in the period from the first timing to the third timing is a voltage wherein the resonance voltage Vr21 generated due to the first step voltage and the resonance voltage Vr22 generated due to the second step voltage are combined. Consequently, the voltage generated between the U1 and V1 terminals of the motor 4 in this period is a voltage having a fall gentler than that of the resonance voltage shown in FIG. 9. Also, from the third timing onward, the voltage is a voltage wherein the resonance voltages Vr21, Vr22, and Vr23 are combined. Consequently, the voltage generated between the U1 and V1 terminals of the motor 4 from the third timing onward is a direct current with a size of 0(V).

From the above description, it is seen that, owing to the working of the surge voltage suppression processing unit 3b according to the invention, the voltage between the U1 and V1 terminals of the motor 4 is a voltage that falls gently from the direct current voltage Ed(V) to 0(V), and not a surge voltage that falls abruptly. As a result of this, it is possible to prevent motor coil isolation.

Figure 4A:
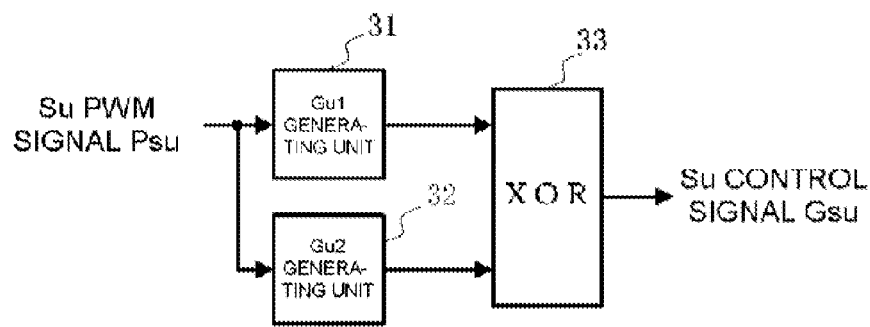

Next, a description will be given, using FIG. 4A and FIG. 4B, of the surge voltage suppression processing unit 3b according to the invention. FIG. 4A is one example of the surge voltage suppression processing unit 3b for generating a control signal for the semiconductor switching element Su represented as a block diagram. Also, FIG. 4B represents the relationship between the input and output signals of each block of FIG. 4A as a timing chart.

In FIG. 4A, 31 is a Gu1 generating unit, 32 a Gu2 generating unit, and 33 an exclusive OR unit XOR. The output of the exclusive OR unit XOR forms the control signal Gsu for the semiconductor switching element.

Figure 4B:
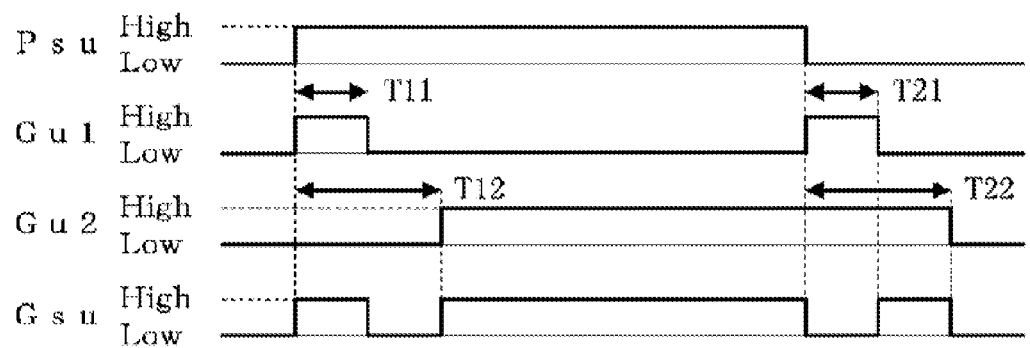
FIG. 4B is a timing chart showing the relationship between the input and output signals of each block of FIG. 4A.

Firstly, the Gu1 generating unit 31, with the pulse width modulation signal Psu generated in the pulse width modulation unit 3a shown in FIG. 1 as an input, outputs a signal Gu1 that is High for the time T11, as shown in FIG. 4B, when the input signal Psu changes from Low to High. Also, the Gu1 generating unit 31 outputs a signal Gu1 that is High for the time T21, as shown in FIG. 4B, when the input signal Psu changes from High to Low.

Next, the Gu2 generating unit 32, also with the pulse width modulation signal Psu as an input, outputs a signal Gu2 that changes from Low to High delayed by the time T12, as shown in FIG. 4B, when the input signal Psu changes from Low to High. Also, the Gu2 generating unit 32 outputs a signal Gu2 that changes from High to Low delayed by the time T22, as shown in FIG. 4B, when the input signal Psu changes from High to Low. Although the Gu2 generating unit 32 may be a simple delay circuit, the Psu signal is simply output delayed by a predetermined time in this case, meaning that it is inevitable that "the time T12=the time T22".

The exclusive OR unit 33, with the control signals Gu1 and Gu2 output by the Gu1 generating unit 31 and Gu2 generating unit 32 as inputs, carries out an exclusive OR, outputting a control signal Gsu that is High only when one of the inputs is High. Consequently, the control signal Gsu is High for the time T11 when the pulse width modulated signal Psu changes from Low to High, subsequently changes to Low, and changes to High again after a time (T12−T11) has elapsed. Also, the control signal Gsu is Low for the time T21 when the pulse width modulated signal Psu changes from High to Low, subsequently changes to High, and changes to Low again after a time (T22−T21) has elapsed.

Figure 3:
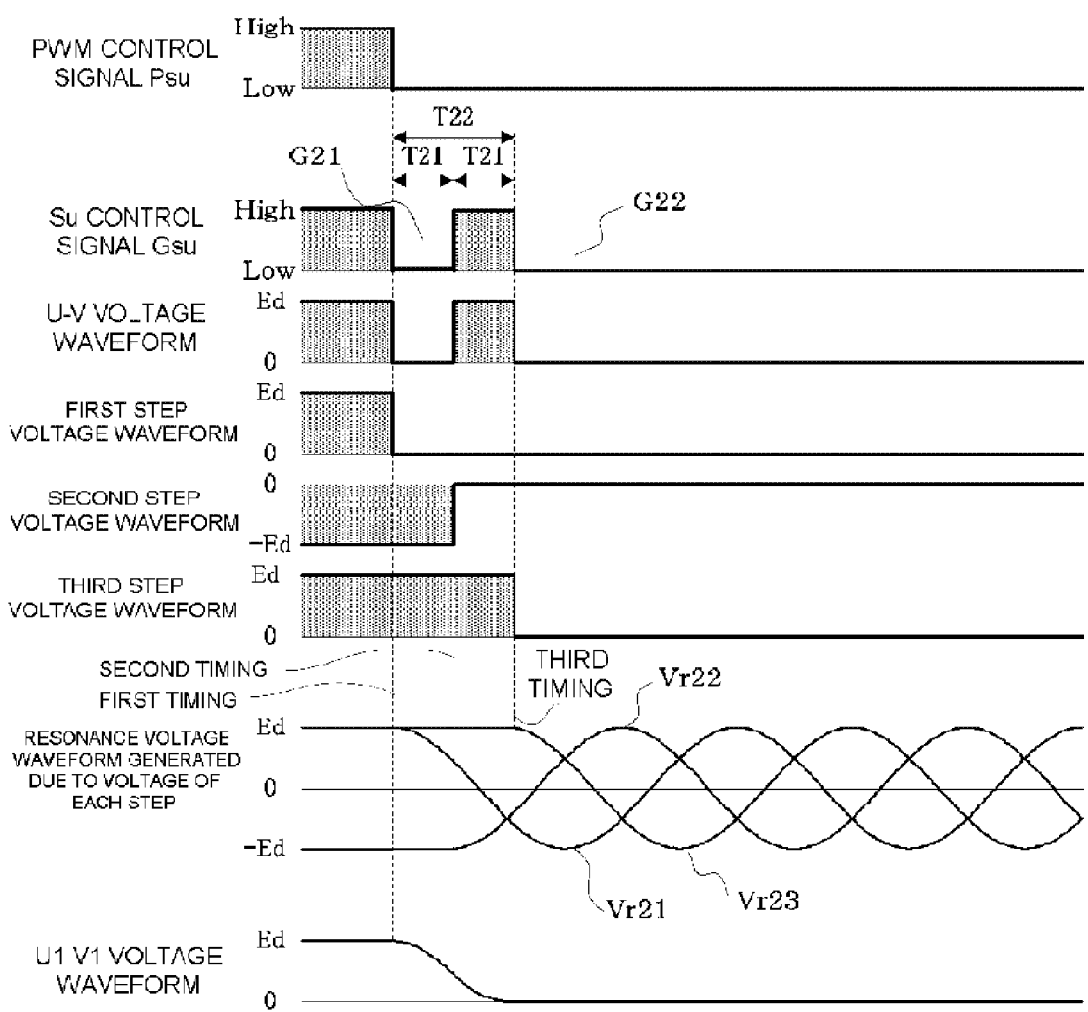
FIG. 3 is a diagram illustrating a principle of suppressing motor terminal portion surge voltage generated when a semiconductor switching element is turned off.

Herein, provided that the time T12 is a time twice the time T11 and the time T22 is a time twice the time T21, it is possible to obtain the control signals Gsu shown in FIG. 2 and FIG. 3.

As it is possible to configure the surge voltage suppression processing unit 3b according to the invention in a stage after the pulse width modulation unit 3a, which is heretofore known technology, using an electronic circuit, no increase in the size of the power converter is entailed.

Also, as the surge voltage suppression processing unit 3b shown in FIGS. 4A and 4B is one example of logic for obtaining the control signal Gsu, it is clear that it is possible to produce the advantages according to the invention using other logic, provided that it is possible to obtain the control signals Gsu shown in FIG. 2 and FIG. 3. Consequently, the surge voltage suppression processing unit 3b according to the invention is not limited to the block diagram shown in FIG. 4.

Figure 5:
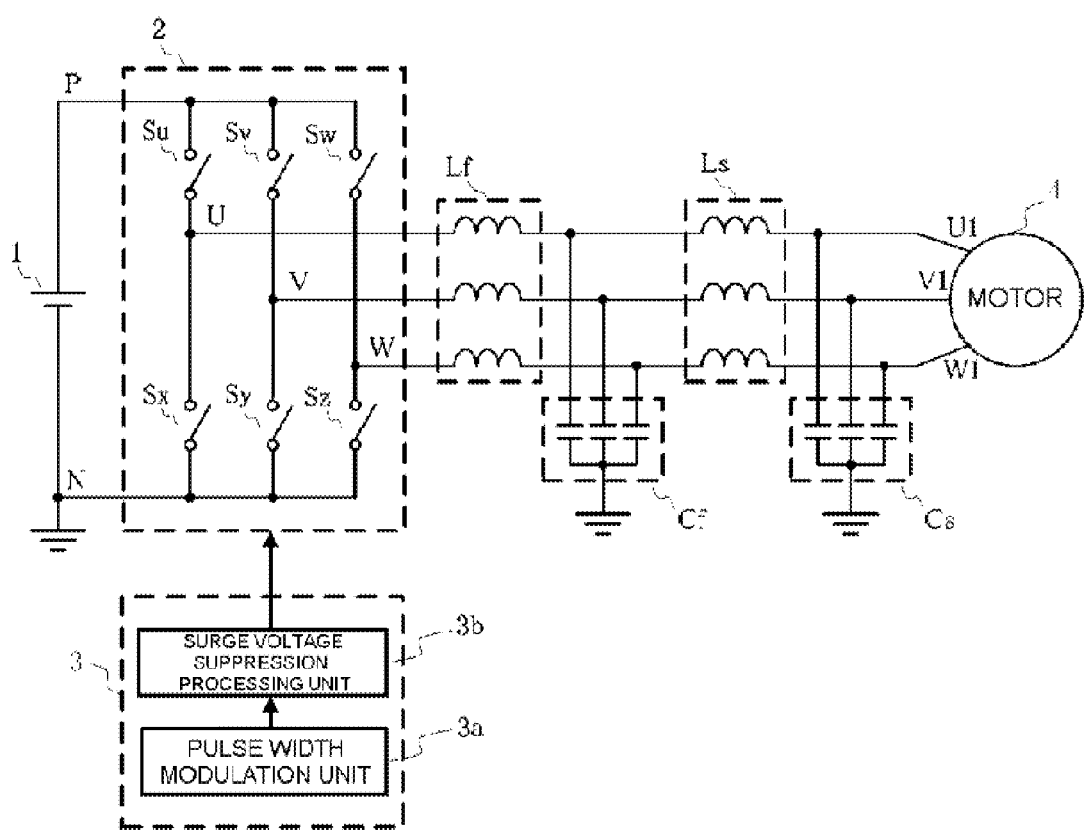
FIG. 5 is a diagram showing another working example of the power converter according to the invention.

Next, FIG. 5 is a motor drive system circuit configuration diagram showing another working example of the invention. This working example differs from the working example of FIG. 1 in that an LC filter formed of an inductor Lf and a capacitor Cf is provided between the inverter 2 and motor 4. The inductor Lf of the LC filter is inserted between the terminals U, V, and W of the inverter 2 and input terminals U1, V1, and W1 of the motor 4. Also, the capacitor Cf of the LC filter is such that each of one ends thereof is connected between the inductor Lf and the input terminals U1, V1, and W1 of the motor 4, while the other ends are connected collectively to the N terminal side of the direct current power source 1.

Herein, provided that the inductance value of the inductor Lf and the capacitance value of the capacitor Cf are chosen to be values approximately ten times the inductance value of the wire inductor Ls and the capacitance value of the floating capacitor Cs, or values greater than that, the rise and fall of voltage applied to the LC circuit configured of the inductor Ls and floating capacitor Cs will be gentle. As a result of this, it is possible to suppress resonance in the LC circuit configured of the inductor Ls and floating capacitor Cs.

However, it can be supposed that resonance occurs between the inserted LC filter and the inverter 2. A resonance cycle T of the LC filter, being fixed by the inductance value Lfx (H) of the inductor Lf and the capacitance value Cfx(F) of the capacitor Cf, is such that $T=1/[2\pi\sqrt{(Lfx \times Cfx)}]$ (s).

Therefore, in order to suppress the resonance of the inserted LC filter, the times T11 and T21 of the surge voltage suppression processing unit 3b of FIG. 5 are set to one-sixth of the resonance cycle T of the LC filter. By setting the times T11 and T21 in this way, it is possible to suppress the resonance of the LC filter using the same kind of principle as the principles shown in FIG. 2 and FIG. 3. As a result of this, it is possible to suppress surge voltage generated in the input terminals of the motor 4, thus preventing dielectric breakdown of the motor 4.

Figure 6:
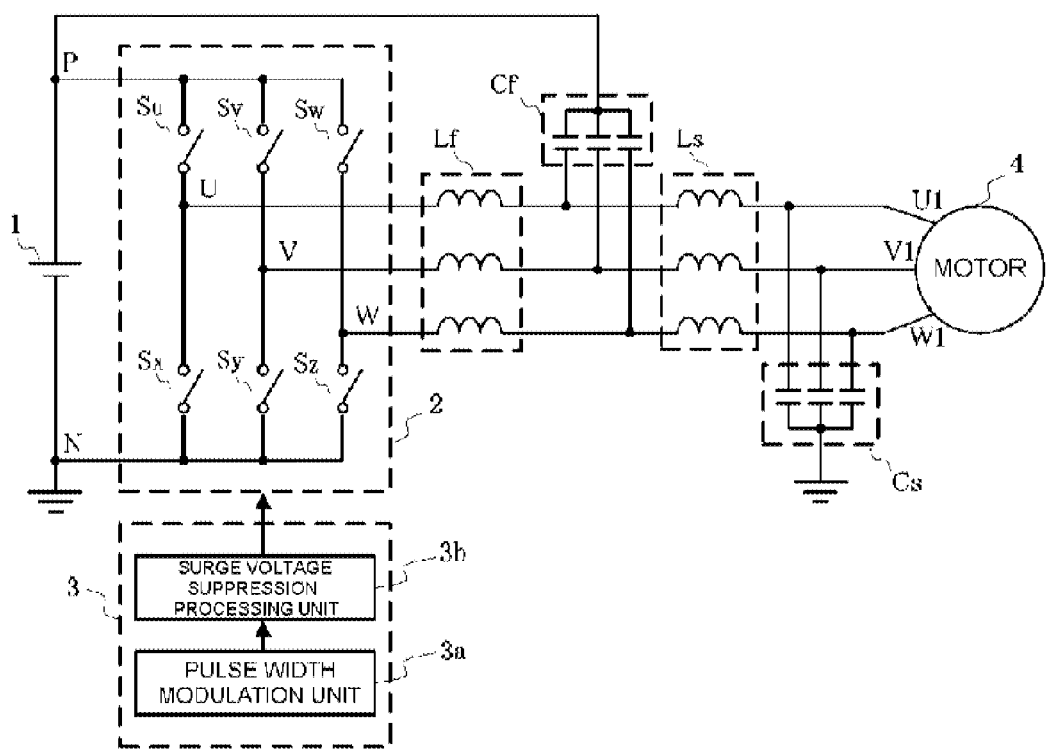
FIG. 6 is a diagram showing still another working example of the power converter according to the invention.

Next, FIG. 6 is a motor drive system circuit configuration diagram showing still another working example using the power converter according to the invention. This working example differs from the working example shown in FIG. 5 in that the other ends of the capacitor Cf are connected collectively to a P terminal side of the direct current power source 1. The inductance value of the inductor Lf, the capacitance value of the capacitor Cf, and the times T11 and T21 of the surge voltage suppression processing unit 3b are the same as in the working example shown in FIG. 5.

Even when connecting the LC filter in this way, it is possible to suppress the resonance of the LC filter, in the same way as in the working example shown in FIG. 5. As a result of this, it is possible to suppress surge voltage generated in the input terminals of the motor 4, thus preventing dielectric breakdown of the motor 4.

Figure 7:
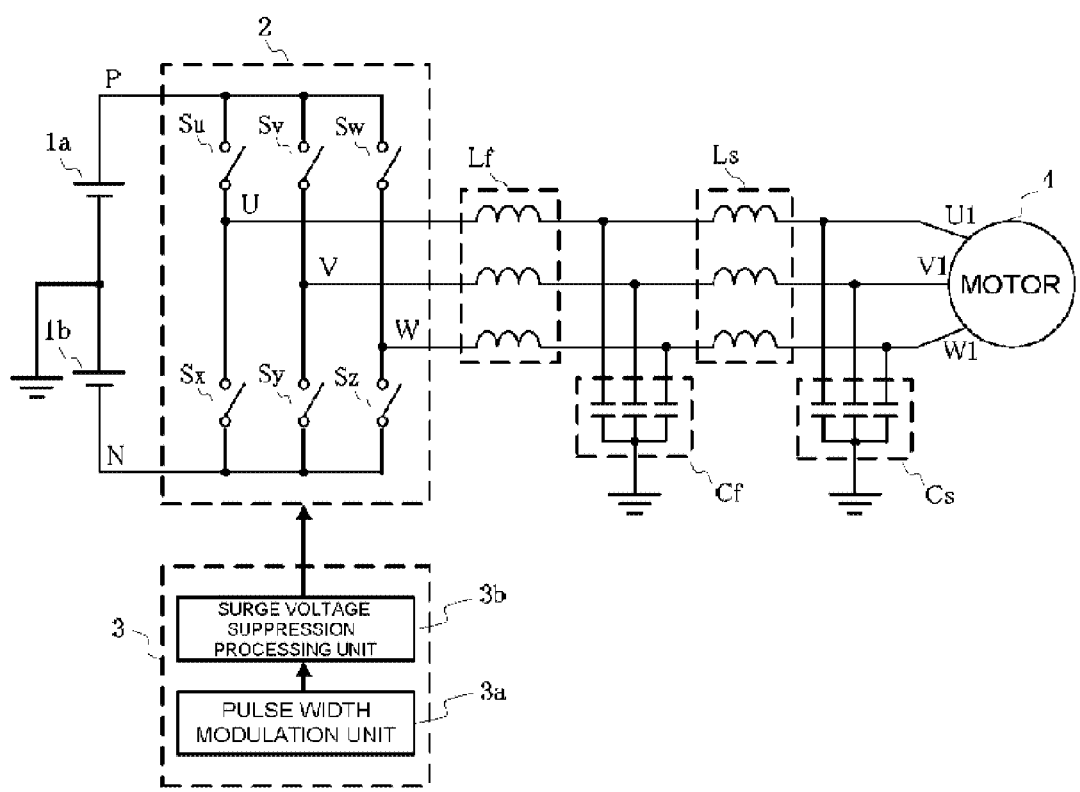
FIG. 7 is a diagram showing still another working example of the power converter according to the invention.

Next, FIG. 7 is a motor drive system circuit configuration diagram showing still another working example using the power converter according to the invention. This working example differs from the working example shown in FIG. 5 in that a direct current power source is configured by a direct current power source 1a and direct current power source 1b being connected in series, and the other ends of the capacitor Cf are connected collectively to a series connection point of the direct current power source 1a and direct current power source 1b. The inductance value of the inductor Lf, the capacitance value of the capacitor Cf, and the times T11 and T21 of the surge voltage suppression processing unit 3b are the same as in the working example shown in FIG. 5.

Even when connecting the LC filter in this way, it is possible to suppress the resonance of the LC filter, in the same way as in the working example shown in FIG. 5. As a result of this, it is possible to suppress surge voltage generated in the input terminals of the motor 4, thus preventing dielectric breakdown of the motor 4.

Also, in the working examples shown in FIG. 5 and FIG. 6, electrical parts added in order to suppress surge voltage are the inductor Lf and capacitor Cf, and there is no need to further add a resistor that consumes surge voltage energy, a diode bridge circuit, or the like, as with the heretofore known technology. Consequently, it is possible to suppress an increase in size and an increase in cost of the power converter.

In the heretofore described working examples of the invention, actions and advantages of the invention have been described taking a motor drive system using a three-phase voltage type PWM inverter as an example but, the inverter load not being limited to a motor, it is also possible to provide the same actions and advantages with an inverter having an electrical circuit or electrical part other than a motor as a load. Also, the inverter not being limited to a three-phase inverter, it may be a single-phase inverter, or a multi-phase inverter of more than three phases. Also, the inverter not being limited to a two-level inverter, it may be a multi-level inverter of three levels or more.

Furthermore, the modulation method too, not being limited to a pulse width modulation, may be any method whereby a square wave voltage is output to a load.

As the power converter according to the invention is such as to cause an on-off-on action or off-on-off action in a time one-sixth of the resonance cycle of impedance between a semiconductor switching element and a load when the semiconductor switching element shifts to an on-state or off-state, it is possible to suppress the generation of surge voltage owing to the superposition effect of resonance voltage generated due to each switching action.

The invention claimed is:

1. A power converter for converting power received from a power source, and supplying the converted power to a load, comprising:
   a semiconductor switching element; and
   a control circuit that controls turning on and off of the semiconductor switching element;
   the control circuit providing a control signal for turning the semiconductor switching element into an on-state, wherein
   the control signal is configured of a first on-signal and a second on-signal,
   an off-state period is provided between the first on-signal and second on-signal of the control signal, the off-state period being a time practically equivalent to a period of the first on-signal, and
   the period of the first on-signal and the off-state period are set to a time practically one-sixth of a resonance cycle of impedance existing between the semiconductor switching element and the load.

2. A power converter for converting power received from a power source, and supplying the converted power to a load, comprising:
   a semiconductor switching element;
   a control circuit that controls turning on and off of the semiconductor switching element; and
   an LC circuit formed of an inductor and a capacitor, the inductor being connected between the semiconductor switching element and the load, the capacitor being connected between a load side terminal of the inductor and one end of the power source;
   the control circuit providing a control signal for turning the semiconductor switching element into an on-state, wherein
   the control signal is configured of a first on-signal and second on-signal,
   an off-state period is provided between the first on-signal and the second on-signal of the control signal, the off-state period being a time practically equivalent to a period of the first on-signal, and
   the period of the first on-signal the off-state period are set to a time practically one-sixth of a resonance cycle of the LC circuit provided between the semiconductor switching element and the load.

3. A power converter for converting power received from a power source, and supplying the converted power to a load, comprising:
   a semiconductor switching element; and
   a control circuit that controls turning on and off of the semiconductor switching element;
   the control circuit providing a control signal for turning the semiconductor switching element into an off-state, wherein
   the control signal is configured of a first off-signal and a second off-signal,
   an on-state period is provided between the first off-signal and the second off-signal of the control signal, the on-state period being a time practically equivalent to a period of the first off-signal, and
   the period of the first off-signal and the on-state period provided are set to a time practically one-sixth of a resonance cycle of impedance existing between the semiconductor switching element and the load.

4. A power converter for converting the power received from a power source, and supplying the converted power to a load, comprising:
   a semiconductor switching element;
   a control circuit that controls turning on and off of the semiconductor switching element; and
   an LC circuit formed of an inductor and a capacitor, the inductor being connected between the semiconductor switching element and the load, the capacitor being connected between a load side terminal of the inductor and one end of the power source;
   the control circuit providing a control signal for turning the semiconductor switching element into an off-state, wherein
   the control signal is configured of a first off-signal and a second off-signal, an on-state period is provided between the first off-signal and the second off-signal of the control signal, the on-state period being a time practically equivalent to a period of the first off-signal, and the period of the first off-signal and the on-state period are set to a time practically one-sixth of a resonance cycle of the LC circuit provided between the semiconductor switching element and the load.

5. An apparatus comprising:
   an inductive device;
   a capacitive device coupled to the inductive device;
   a switching device having output terminals coupled to the inductive device and the capacitive device; and
   a control device coupled to the switching device, configured to output a sequence of on and off signals to cause a sequence of state changes in the switching device;
   wherein the sequence of on and off signals is configured to cause a sequence of resonance voltage waveforms in the inductive device and capacitive device, caused by the sequence of state changes in the switching device, to combine so as to generate a composite waveform of a predetermined profile;
   wherein the sequence of on and off signals comprises an on signal followed by an off signal of substantially a same duration as the on signal.

6. The apparatus of claim 5, wherein the sequence of on and off signals is configured to generate a sequence of at least partly overlapping step waveforms at the output terminals of the switching device.

7. The apparatus of claim 5, wherein the duration is substantially equal to a portion of a resonance cycle of the inductive device and the capacitive device.

8. The apparatus of claim 5, wherein the switching device is coupled via the inductive device and the capacitive device to a motor.

9. The apparatus of claim 5, wherein the control device is coupled to a pulse-width modulation device.

* * * * *